United States Patent [19]

Raevsky et al.

[11] Patent Number: 5,082,877
[45] Date of Patent: Jan. 21, 1992

[54] HEAT INSULATING ABLATIVE-TYPE MATERIALS

[75] Inventors: Vitaly Raevsky, Cherry Hill, N.J.; Lev Y. Zlatkevich, Philadelphia, Pa.; Robert D. Brown, Cinnaminson, N.J.

[73] Assignee: Ad-Va-Cote Tri-State Inc., Cinnaminson, N.J.

[21] Appl. No.: 375,095

[22] Filed: Jun. 30, 1989

[51] Int. Cl.$^5$ .................................... C09K 21/14
[52] U.S. Cl. ................................ 523/179; 524/419; 524/421; 524/423
[58] Field of Search ................ 523/179; 524/419, 421, 524/423

[56] References Cited

U.S. PATENT DOCUMENTS

| | | | |
|---|---|---|---|
| 3,472,812 | 10/1969 | Byrne et al. | 523/179 |
| 4,122,059 | 10/1978 | Hansen | 523/515 |
| 4,446,061 | 5/1984 | Joyce, III et al. | 252/602 |
| 4,462,831 | 7/1984 | Raevsky et al. | 106/18.26 |
| 4,632,865 | 12/1986 | Tzur | 428/304.4 |
| 4,743,644 | 5/1988 | Skipper et al. | |

Primary Examiner—Paul R. Michl
Assistant Examiner—John J. Guarriello
Attorney, Agent, or Firm—Seidel, Gonda, Lavorgna & Monaco

[57] ABSTRACT

An ablative-type protective material is provided comprising:
(a) a polymeric compound comprising a plurality of at least a first repeat unit having the form

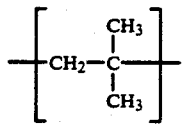

wherein the first repeat unit is present in an amount ranging from about 70 to about 100 mole percent, inclusive and
(b) an aluminum sulfate hydrate of the general formula

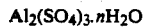

$$Al_2(SO_4)_3 \cdot nH_2O$$

wherein n is an integer from 14 through 18, inclusive and wherein the aluminum sulfate hydrate is present in an amount greater than about 50% by weight of the ablative-type protective material.

The resulting composition exhibits an improved resistance to oxidative degeneration as well as improved heat and flame protection times.

37 Claims, 6 Drawing Sheets

HEAT INSULATING ABLATIVE-TYPE MATERIALS

FIELD OF THE INVENTION

The present invention pertains to fire and heat protective materials of the ablative type. Such materials bar the penetration of flames and/or intense heat.

BACKGROUND OF THE INVENTION

Combustible and/or explosive materials requiring protection from high temperatures and/or open flames are generally either (a) coated with a layer of heat and/or fire protection material, (b) contained within rooms, receptacles, cases or boxes which are made from a heat/fire protective material or (c) sandwiched between multi-layered construction materials containing at least one layer of a heat/fire protective material.

Fire and heat protective materials of the ablative type are generally designed for one-time use. Examples of applications include, coatings for stationary receptacles containing fuel or other combustible substances, coatings for fuel tanks, and the like. Additional applications include protective coatings for stationary storage facilities for explosives and ammunition, as well as coatings for mobile storage facilities for ammunitions carried by planes, helicopters, ships, launches, tanks, and the like. Heat/fire ablative materials may also be applied to safes, lockers, warehouses, storerooms, and the like.

The aforementioned are merely some of the possible applications of heat/fire protective materials.

There are, however, inherent shortcomings with many of the currently existing ablative-type protective materials. Those shortcomings include:

(a) Limited Protection Time. The phrase "protection time" refers to the time needed to heat a material from its normal temperature to a certain threshold temperature, under the influence of a flame and/or heat. A material's protection time is generally measured in terms of hours and/or minutes.

(b) Limited Longevity. The term "longevity" refers to a material's ability to resist oxidative decomposition. A material's longevity is generally measured in terms of years.

(c) Limited Utility. The term "utility" refers to the variety of forms in which the ablative-type materials my be utilized without significantly decreasing their heat/fire protective properties. Typically, such variety of forms include, putties, formable masses, and the like.

(d) High Levels of Toxic Emissions. The phrase "high levels of toxic emissions" refers to (1) the emission of highly toxic fumes and/or (2) the emissions of large amounts of toxic fumes. These toxic emissions result when the ablative-type protective materials are being burned.

Many attempts have been made to produce a heat/fire protective material which resolves some of the aforementioned shortcomings. For example, in U.S. Pat. No. 4,122,059, heat/fire protective mixtures are disclosed which employ the use of hydraulic cements. Specifically, the fire retardency characteristic of these compositions is accomplished by the use of an inorganic salt hydrate (e.g., aluminum sulfate hydrate and ferrous sulfate hydrate) together with a hydraulic cement (e.g., Portland cement). According to the patent, the cement acts as a moisture stabilizer which absorbs water released from the hydrate and converts the resulting mass into a cement.

Moreover, U.S. Pat. No. 4,462,831 discloses a heat/fire protective material wherein organic binders are mixed with a filler consisting of aluminum sulfate hydrate. The aluminum sulfate hydrate is present in an amount greater than 70% by weight of the mixture. The organic binders include unsaturated polyester resin, natural rubber, urea formaldehyde, polypropylene, polyvinyl chloride and blends of polyvinyl chloride and polyester.

These binder materials suffer from certain drawbacks. For example, unsaturated polyester and urea-formaldehyde resins are toxic materials. As such, they emit extremely hazardous fumes when burned. Moreover, polypropylene is not sufficiently durable and/or flexible. Therefore, it use is virtually limited to the insulation of planar surfaces. Also, natural rubber does not satisfactorily resist oxidative degeneration. While these binder materials have associated herewith satisfactory heat protection times, they cannot withstand prolonged contact to an open flame. They readily oxidize when exposed to ambient whether conditions.

In order for a heat/fire protective material to be commercially usable, (1) it must be able to protect against high temperatures and/or open flames for a satisfactory period of time;
(2) it must not oxidatively decompose and/or lose its protective properties over a long period of time, often extending many years; and
(3) it must not emit large amounts of, and/or extremely hazardous, toxic fumes when subjected to extreme temperatures and/or open flames.

Other important characteristics which, while not critical, are, nevertheless, extremely desirable, are the material's ability to be employed in many different forms (e.g., as a putty, as a coating, as a protective sheet, etc.) without significantly sacrificing any of the aforementioned necessary heat/fire protective characteristics.

Accordingly, one object of the invention is to provide a heat/fire protective material which retains many of the aforementioned necessary and desired characteristics.

Other aspects, concepts and objects of this invention will become apparent from the following Detailed Description and appended claims.

SUMMARY OF THE INVENTION

The present invention relates to a heat/fire protective material of the ablative type.

According to the invention, a novel heat/fire protective material of the ablative-type is provided comprising:

(a) a polymeric compound comprising a plurality of at least a first repeat unit having the formula wherein the first repeat unit is present in an amount ranging from about 70 to about 100 mole percent, inclusive and (b) an aluminum sulfate hydrate of the general formula wherein n is an integer from 14 through 18, inclusive, and wherein the aluminum sulfate hydrate is present in an amount greater than about 50% by weight of the material.

The invention is more thoroughly described in the following Detailed Description, which references the attached drawings, forming a part thereof, and which are briefly described below.

DETAILED DESCRIPTION OF THE INVENTION

The novel heat/fire protective material of the present invention exhibits exceptionally long heat and fire protection times while resisting oxidative degeneration. Moreover, the novel material can be produced as a plastic which is suitable for use with structural supports, partitions, receptacles, cases etc. The novel material can also be formed into sheets, or hard or soft insulative coverings such as putties. Furthermore, it is within the scope of this invention to optionally reinforce the novel heat/fire protective material with substances such as glass fibers, non-woven textile fabric, metal, textile mesh, and the like.

The present invention relates to a heat/fire protective material of the ablative type. According to the invention, the novel heat/fire protective material comprises:
(a) a polymeric compound comprising a plurality of at least a first repeat unit having the formula wherein the first repeat unit is present in an amount ranging from about 70 to about 100 mole percent, inclusive and
(b) an aluminum sulfate hydrate of the general formula wherein n is an integer from 14 through 18, inclusive, and wherein the aluminum sulfate hydrate is present in an amount greater than about 50% by weight of the resulting material.

I have discovered that a composition comprising such a polymeric compound and an aluminum sulfate hydrate produces a material having associated therewith unexpectedly superior heat/fire protective characteristics as well as an improved resistance to oxidative degeneration.

As used herein, the term "polymeric compound" includes homo-, co-, and other higher polymer compositions comprising a plurality of at least a first repeat unit having the formula wherein the first repeat unit is present in an amount ranging from about 70 to about 100 mole percent, inclusive. Preferably, the first repeat units are present in an amount ranging from about 85 to about 100 mole percent, and more preferably from about 95 to about 100 mole percent. The molar percentages are based on the total moles of repeat units present in the polymeric compound.

Optionally, the polymeric compound employed in the invention can further comprise a plurality of a second repeat unit having the formula wherein the second repeat unit is present in an amount ranging from about 0 to about 30 mole percent, inclusive. Preferably, the second repeat units are present, if at all, in an amount ranging from about 0 to about 15 mole percent, and more preferably, from about 0 to about 5 mole percent. The molar percentages are based on the total moles of repeat units present in the polymeric compound.

In addition to the above structural characteristics, the polymeric compound employed in the invention must be able to be thoroughly mixed with an aluminum sulfate hydrate at a temperature which does not result in decomposing the aluminum sulfate hydrate.

As used herein, the term "polymeric compound" also encompasses blends of the same polymeric compound having different molecular weights.

When practicing the invention, the presently preferred polymeric compound is polyisobutylene.

The term "aluminum sulfate hydrate" refers to compositions having the general formula wherein n is an integer from 14 through 18, inclusive. In the presently preferred embodiment, the aluminum sulfate hydrate has 16 moles of $H_2O$ for each mole of $Al_2(SO_4)_3$. According to CRC Handbook of Chemistry and Physics, 57th Ed. (1976-1977), aluminum sulfate hydrate has a decomposition temperature of 86.5° C.

(See, p. B-86, No. a66). When practicing the invention, the aluminum sulfate hydrate can be employed in any suitable form. Examples of such suitable forms include, but are not limited to a liquid solution, a suspension in a liquid solution and/or a powder form. It is presently preferred that the aluminum sulfate hydrate be employed while in a powder form.

Although other components can be present in the novel heat/fire protective composition, the polymeric compound is generally present in an amount ranging from about 10 to about 50% by weight, preferably, from about 12 to about 40% by weight, and more preferably, from about 15 to about 20% by weight. These weight percentages are based on the total weight of the resulting heat/fire protective composition.

Conversely, the aluminum sulfate hydrate is generally present in an amount equal to at least about 50% by weight of the novel resulting composition. Preferably, the aluminum sulfate hydrate is present in an amount ranging from about 50 to about 90% by weight, more preferably, from about 60 to about 87% by weight, and even more preferably, from about 70 to about 85% by weight. These weight percentages are based on the total weight of the resulting composition.

Notwithstanding the presence of other components, the weight ratio between the polymeric compound and the aluminum sulfate hydrate generally ranges from about 1:1 to about 1:10. Preferably, this weight ratio ranges from about 1:2 to about 1:7, and more preferably, from about 1:4 to about 1:5.

As stated above, it is preferred that the weight percentage of the aluminum sulfate hydrate not exceed 90%. One reason for this is that the addition of large amounts of aluminum sulfate hydrate, in conjunction with a high molecular weight polymeric compound (e.g., avg. mol. wt. >at least about 700,000), may lead to processing problems such as the need for prolonged mixing.

If, however, compositions containing more than 90 wt.% of aluminum sulfate hydrate are desired, I have discovered certain measures which can be undertaken to accomplish this objective. For example, the aluminum sulfate hydrate may be mixed with (1) a polymeric compound having an average molecular weight less than about 700,000 and/or (2) a blend of a first polymeric compound, having a polymeric compound having a molecular weight less than that of the first polymeric compound such that the average molecular weight of the first and second polymeric compounds is less than about 700,000.

I have also discovered that employing a blend of a high and low molecular weight polymeric compound, in conjunction with an aluminum sulfate hydrate, results in an ablative-type protective material which exhibits an unexpected improvement in the material's resistance to an open flame.

In order to realize appreciate the improved resistance to open flames, the resulting ablative-type protective composition should have a concentration of a high molecular weight polymeric compound (i.e., avg. mol wt. at least about 400,000) ranging from about 10 to about 45% by weight. Preferably, the concentration of the high molecular weight polymeric compound in the resulting composition should range from about 15 to about 35% by weight and more preferably from about 20 to about 30% by weight. Conversely, the concentration of the low molecular weight polymeric compound (i.e., avg. mol. wt. of at most about 15,000 as determined by the Staudinger Molecular weight test method) should range from about 5 to about 40% by weight. Preferably, the concentration of the low molecular weight polymeric compound in the resulting composition should range from about 15 to about 35% by weight, more preferably, from about 20 to about 30% by weight. The aforementioned weight percentages are based on the total weight of the resulting ablative-type protective composition.

As used herein, the phrase "high molecular weight polymeric compound" generally refers to polymeric compounds having an average molecular weight of at least about 400,000 as determined by intrinsic viscosity. Preferably, the average molecular weight of high molecular weight polymeric compounds, as referred to herein, ranges from about 500,000 to about 3,000,000 and more preferably, from about 700,000 to about 2,500,000.

As used herein, the phrase "low molecular weight polymeric compound" generally refers to polymeric compounds having an average molecular weight of at most about 15,000 as determined by the Staudinger Molecular Molecular Weight test method. Preferably the average molecular weight of low molecular weight polymeric compounds, as referred to herein, ranges from about 15,000 to about 7,000, and more preferably, from about 15,000 to about 10,000.

Notwithstanding the presence of other components, when practicing the invention in order to obtain a material having an improved resistance to open flames, the weight ratio between the high molecular weight polymeric compound to the low molecular weight polymeric compound generally ranges from about 6:1 to about 1:1. Preferably, this weight ratio ranges from about 4:1 to about 1.25:1, and more preferably, from about 3:1 to about 1.5:1.

As stated earlier, other components can also be present in the novel composition. Examples of such optional components include, but are not limited to, antioxidants, support materials and/or processing additives.

The present invention also provides a method for the manufacture of the novel heat/fire protective materials. According to one embodiment of the invention, all the ingredients making up the novel composition are mixed together until a substantially homogeneous mass is obtained. The mixing process can be carried out in any type of apparatus, known to those skilled in the art, which does not require heating the ingredients to a temperature which decomposes the aluminum sulfate hydrate. Examples of such mixing devices include roll mills and Banburry mixers. After the mixing process, the resulting mass has the aluminum sulfate hydrate embedded into the matrix of the polymeric compound.

When preparing the novel heat/fire protective material, it is critical that the temperatures employed during preparation do not result in the decomposition of the aluminum sulfate hydrate. As stated earlier, according to *CRC Handbook of Chemistry and Physics*, 57th ed., aluminum sulfate hydrate decomposes at 86.5° C. As such, if processing temperatures exceed 86.5° C., the heat/fire protective properties of the resulting composition will significantly diminish.

The heat/fire protective materials of the present invention may optionally be strengthened by incorporating therein support materials such as glass fibers, asbestos fibers, textile fabric, metal wire mesh and/or textile mesh. It is also within the scope of the present invention to produce a composite of two or more sandwiched layers, wherein at least one of the layers is the novel heat/fire protective composition.

As stated earlier, a solution comprising aluminum sulfate may be employed when preparing the novel compositions. In this instance, the aluminum sulfate may be mixed with the polymeric latex (at a pH <7). The hydrated salt is formed in its required form (i.e., powder) by a controlled drying process. This results in simultaneously embedding the powder-form aluminum sulfate hydrate into the matrix of the polymeric latex.

Another approach for preparing the novel compositions of this invention is to prepare the aluminum sulfate hydrate in situ by reacting two or more reagents which will produce the hydrate.

Moreover, the aluminum sulfate hydrate can also be introduced during the polymerization process of the polymeric compound, thus, excluding the necessity of a subsequent blending step.

The novel heat/fire protective compositions can be prepared in any suitable form. Examples of such suitable forms include, but are not limited to, flexible plates, rigid plates (for used in sandwich-type constructions), panel sections, coatings, putties and/or pastes.

In the instances where the novel composition comprises an amount of a low molecular weight polymeric compound, the resulting composition exhibits good adhesion to metals, wood, concrete, and the like. The amount of low molecular weight polymeric compound necessary to result in good adhesion properties depends upon the physical characteristics of the material to which the novel composition will be bonded and the condition of the material at the time of bonding. If necessary, however, contact cement, epoxy and/or other glues can be utilized for bonding the novel ablative-type protective compositions to the surface of the material and/or object which is to be protected.

This invention will be more fully understood from the following examples. The examples are only intended to demonstrate the utility of selected embodiments of the invention and are, in no way, intended to limit the scope of the present invention. The examples also compare the inventive compositions with other abalative compositions with other ablative compositions.

EXAMPLE I

This example compares the oxidative degeneration (i.e., durability) of natural rubber and polyisobutylene. The natural rubber used in this example is commercially available from Hermann Weber, Co., Inc. under the trade name SMR-10. The polyisobutylene used in this example is commercially available from Exxon Chemical Company under the trade name Vistanex TM MM-L80 (avg. mol. wt. about 800,000).

Thin 50 μm slices were cut from natural rubber and polyisobutylene slabs. Each 50 μm specimen was evaluated with a chemiluminograph manufactured by Pola Co. The chemiluminograph generated chemiluminescence curves from which the chemiluminesce induction time (A) and the oxidation rate (B) can be obtained. For purposes of this and future examples, the ratio of A:B is defined as the sample's durability. Each sample's durability is recorded in TABLE I.

TABLE I

| Product | Durability (hr) |
| --- | --- |
| Natural rubber | 0.61 |

TABLE I-continued

| Product | Durability (hr) |
| --- | --- |
| Polyisobutylene | 1.1 |

Figure 1:
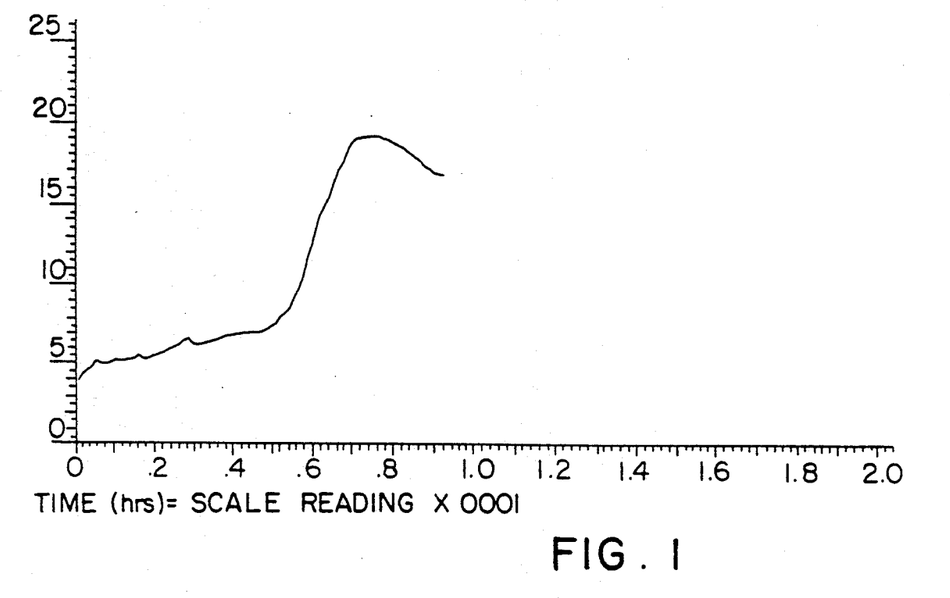
FIG. 1 is a chemiluminescence curve for the oxidation of natural rubber.
Figure 2:
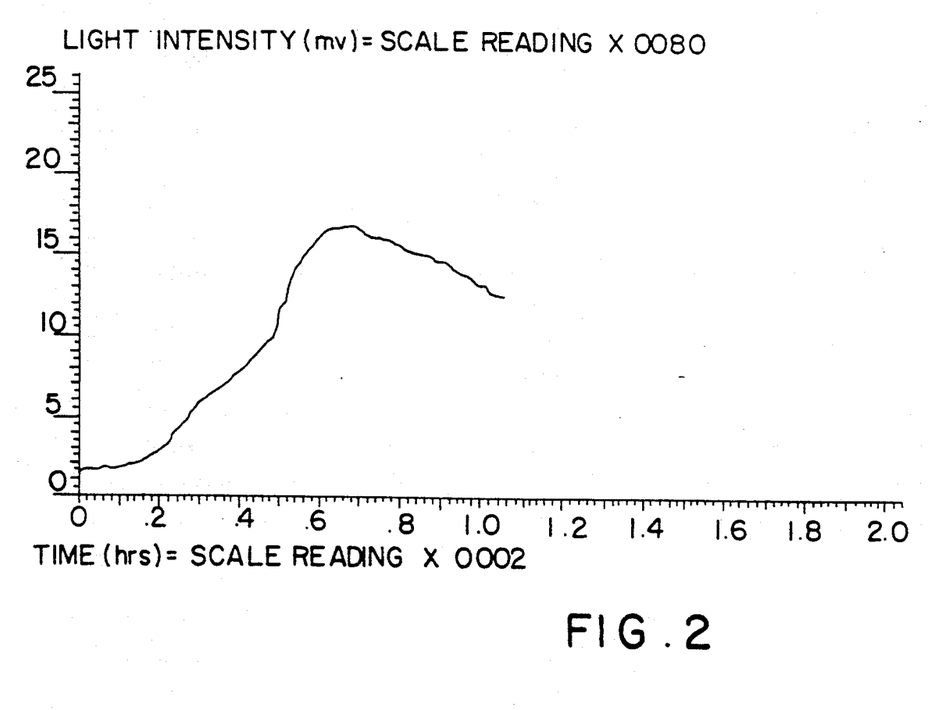
FIG. 2 is a chemiluminescence curve for the oxidation of polyisobutylene.

To aid in making the comparison, the chemiluminescence curves for natural rubber and polyisobutylene are illustrated on the graphs in FIGS. 1 and 2, respectively.

The data in TABLE I and FIGS. 1 and 2 demonstrate that polyisobutylene has a durability which is approximately two times greater than that of natural rubber.

EXAMPLE II

This example compares the oxidative degeneration (i.e., durability) of two different mixtures. The first is a mixture of an aluminum sulfate hydrate and natural rubber. The second is a mixture of aluminum sulfate hydrate and polyisobutylene. The natural rubber and polyisobutylene used in this example were the same as those employed in Example I. The aluminum sulfate hydrate employed in this Example is a commercially available Powder Tech. grade from Sergeant Company.

The first mixture was prepared by roll milling a 20 gram slab of natural rubber with 80 grams of aluminum sulfate hydrate. A 50 μm specimen was then cut from the resulting first mixture.

The second mixture was then prepared by roll milling a 20 gram slab of polyisobutylene and 80 grams of aluminum sulfate hydrate. A 50 μm specimen was cut from the resulting second mixture.

During the above roll milling processes, the internal temperature of the mill did not exceed 70° C.

The two 50 μm specimens were each subjected to the same durability test as that described in Example I. The observed results are recorded in TABLE II.

TABLE II

| Product | Durability (hr) |
| --- | --- |
| Natural rubber/aluminum sulfate hydrate | 0.15 |
| Polyisobutylene/aluminum sulfate hydrate | 1.0 |

Figure 3:
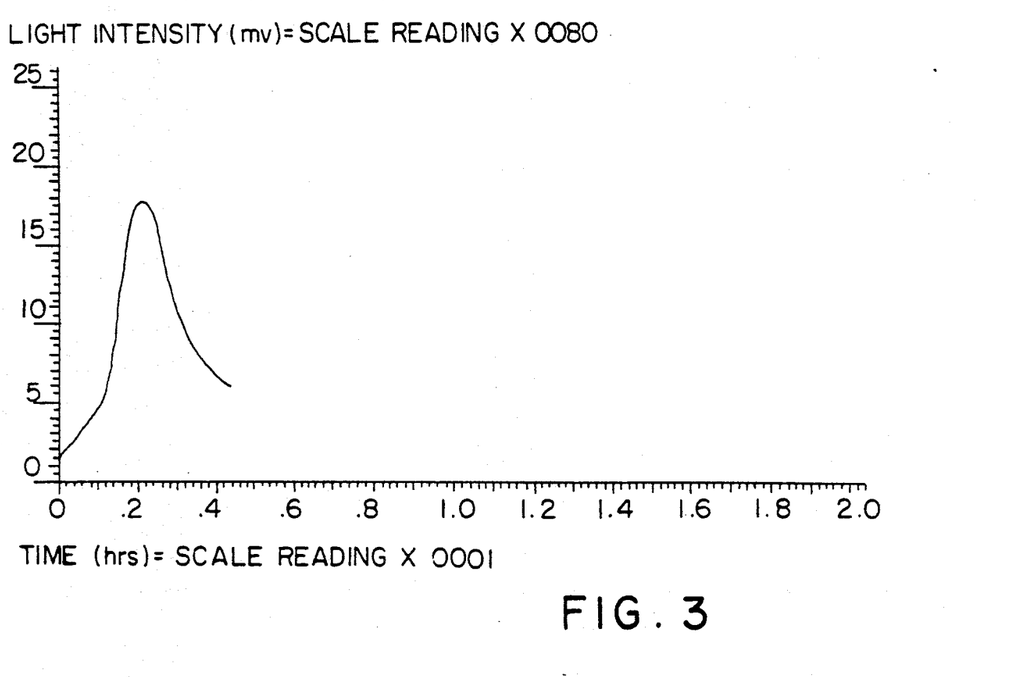
FIG. 3 is a chemiluminescence curve for the oxidation of a mixture of aluminum sulfate hydrate and natural rubber.
Figure 4:
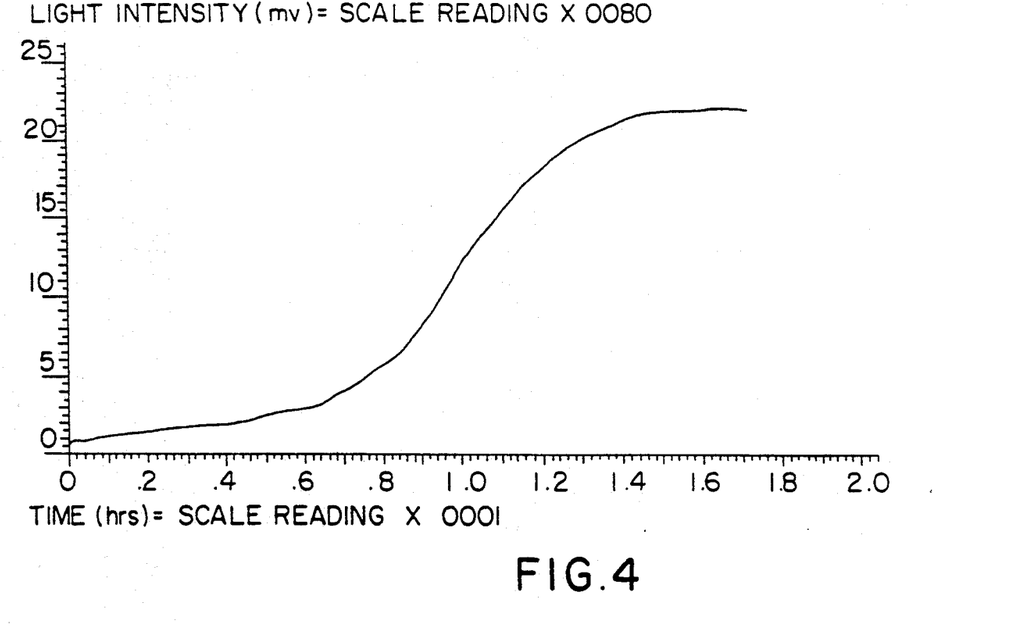
FIG. 4 is a chemiluminescence curve for the oxidation of a mixture of aluminum sulfate hydrate and polyisobutylene.

To aid in making this comparison, the chemiluminescence curves for the natural rubber/aluminum sulfate hydrate mixture and the polyisobutylene/aluminum sulfate hydrate mixture are illustrated on the graphs in FIGS. 3 and 4, respectively.

When comparing the data from TABLE I with that from TABLE II, it is observed that the natural rubber/aluminum sulfate hydrate mixture had a durability approximately four times less than that of natural rubber, per se. In view of this, it was expected that the polyisobutylene/aluminum sulfate hydrate mixture would also have a durability which is approximately four times less than that of polyisobutylene, per se. It was unexpectedly observed, however, that the durability of the polyisobutylene/aluminum sulfate hydrate mixture is substantially the same as that of polyisobutylene, per se.

The data from TABLE II also demonstrates that the polyisobutylene/aluminum sulfate hydrate mixture has a durability which is approximately seven times greater than that of the natural rubber/aluminum sulfate hydrate mixture. This result was also unexpected since the data in TABLE I demonstrated that the durability of polyisobutylene, per se, was only about twice as great as that of natural rubber, per se.

EXAMPLE III

This example compares the effect of adding antioxidants to a natural rubber/aluminum sulfate hydrate mixture and to a polyisobutylene/aluminum sulfate hydrate mixture. The polyisobutylene, natural rubber and aluminum sulfate hydrate employed in this example are the same as those employed in Example II. The antioxidants used in this example are commercially available from Ciba-Geigy Inc. under the trade names of Irganox TM 1035 and Irganox TM MD-1024.

A first mixture was prepared by roll milling a 20 gram slab of natural rubber, 80 grams of aluminum sulfate hydrate, 0.25 grams of Irganox TM 1035 and 0.25 grams of Irganox TM MD-1024. A 50 μm thick specimen was then cut from the resulting first mixture.

A second mixture was prepared by roll milling a 20 gram slab of polyisobutylene, 80 grams of aluminum sulfate hydrate, 0.25 grams of Irganox TM 1035 and 0.25 grams of Irganox TM MD-1024. A 50 μm thick specimen was then cut from the resulting second mixture.

During the above roll milling processes, the internal temperature of the mill did not exceed 70° C.

The two 50 μm thick specimens were subjected to the same durability test as described in Example I. The observed results are recorded in TABLE III.

TABLE III

| Product | Durability (hr) |
|---|---|
| Natural rubber/aluminum sulfate hydrate/Irganox 1035/ Irganox MD-1024 | 0.45 |
| Polyisobutylene/aluminum sulfate hydrate/Irganox 1035/ Irganox MD-1024 | 7.3 |

Figure 5:
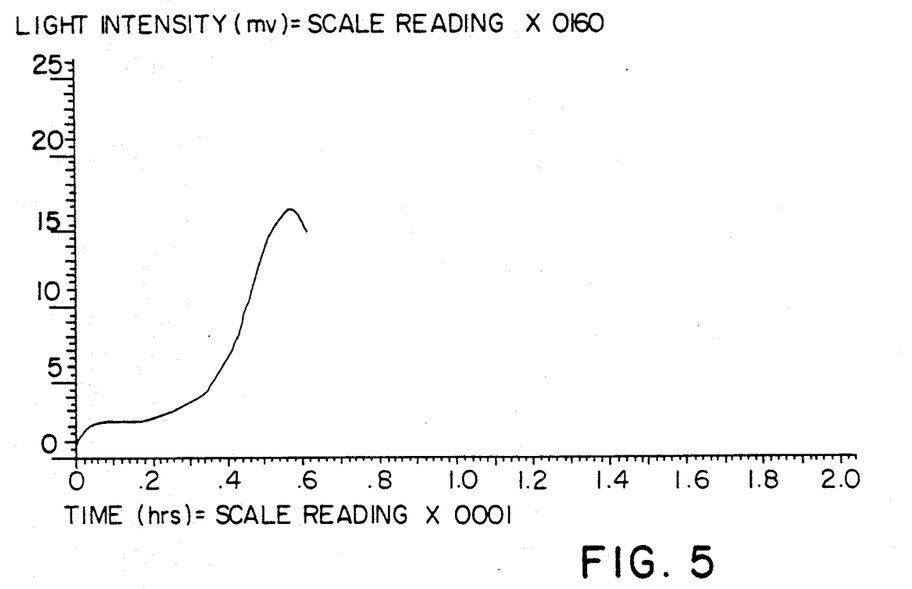
FIG. 5 is a chemiluminescence curve for the oxidation of a mixture of aluminum sulfate hydrate, antioxidants and natural rubber.
Figure 6:
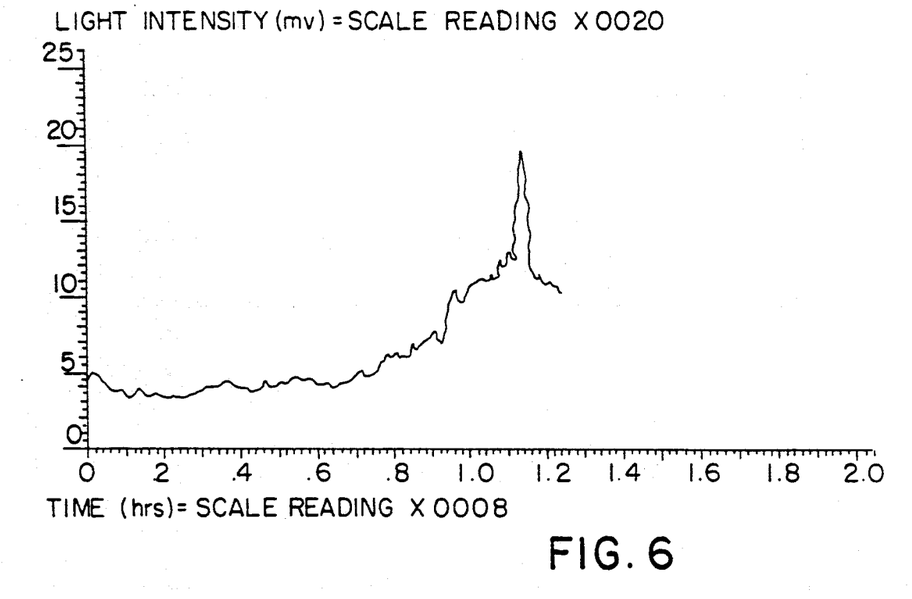
FIG. 6 is a chemiluminescence curve for the oxidation of a mixture of aluminum sulfate hydrate, antioxidants and polyisobutylene.

To aid in making this comparison, the chemiluminescence curves for the specimen containing the natural rubber binder and for that containing the polyisobutylene binder are illustrated on the graphs in FIGS. 5 and 6, respectively.

According to the data in TABLE III, the addition of 0.5 grams of antioxidants increased the durability of the natural rubber/aluminum sulfate hydrate composition by 300% (Compare, TABLES II and III).

It would have been expected that the antioxidants would have a similar effect when blended with the polyisobutylene/aluminum sulfate hydrate mixture. This, however, was not the case. It was unexpectedly observed that the addition of the same amount of the same antioxidants increased the durability of the polyisobutylene/aluminum sulfate hydrate composition by 730%. Compare, TABLES II and III.

EXAMPLE IV

This example compares the heat protection time of a natural rubber/aluminum sulfate hydrate composition with that of a polyisobutylene/aluminum sulfate hydrate composition. The natural rubber, polyisobutylene and aluminum sulfate hydrate were the same as those employed in Example II.

A first mixture was prepared by roll milling a 20 gram slab of the natural rubber with 80 grams of the aluminum sulfate hydrate. A second mixture was then prepared by roll milling a 20 gram slab of polyisobutylene with 80 grams of aluminum sulfate hydrate. During these roll milling processes, the internal temperature of the mill did not exceed 70° C.

The mixtures were then each compression molded into solid sheets of varying thicknesses (i.e., 1.5 mm, 2 mm, 4 mm and 8 mm).

The sheets where then subjected to a small-scale disk test method. The apparatus employed in performing the disk test is diagrammatically illustrated in FIG. 7.

Figure 7:
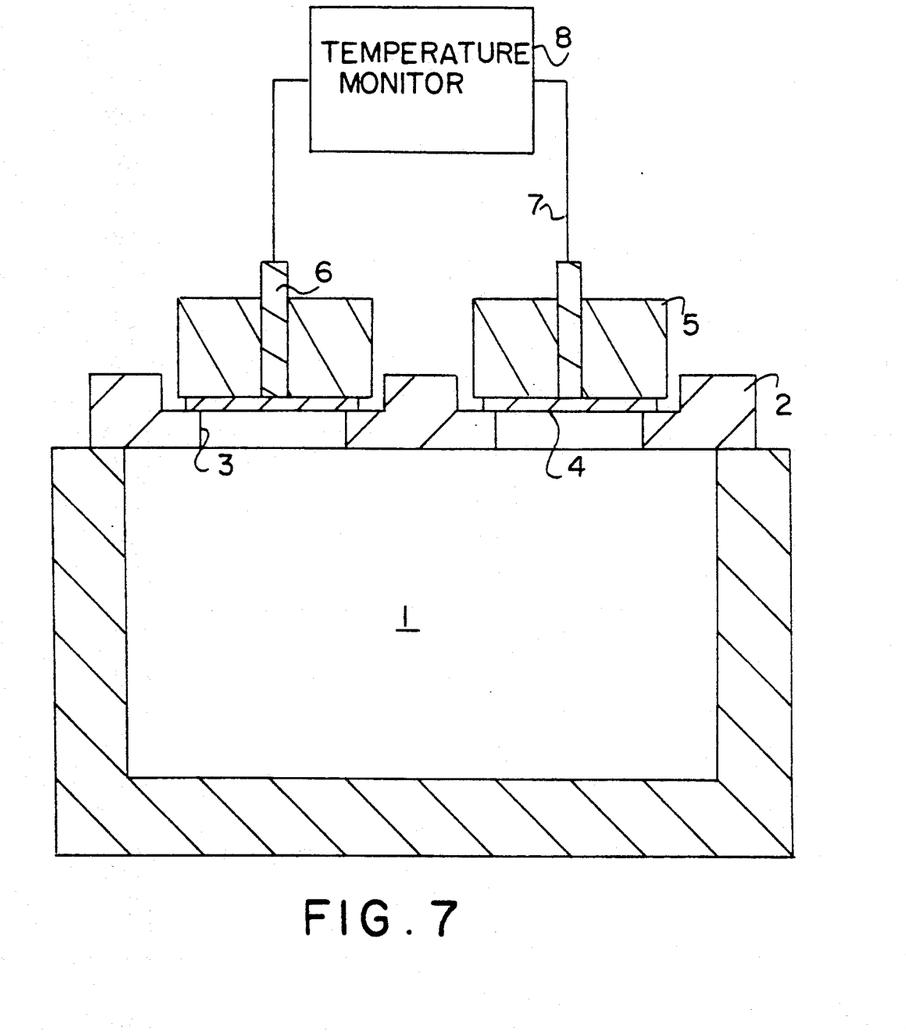
FIG. 7 is a diagrammatic view of a test apparatus for performing a small-scale disk test.

Referring now to FIG. 7, insulating firebrick frame 2 is placed on furnace 1. Frame 2 has pockets defined by ledges 3 for holding samples 4 in place. Insulating firebrick plugs 5 are fitted into the pockets of frame 2 until the lower surface of the plug abuts against the upper portion of the sample being tested. Each plug is dimensioned such that it will rest on ledges 3. Moreover, each plug has a thermocouple 6 passing therethrough. The thermocouple 6 is positioned such that its temperature monitoring end is in direct contact with the upper surface of the sample being tested. Thermocouple 6 is operatively connected to temperature monitoring device 7.

Heat protection time was defined as the time necessary for the temperature of the sample's upper surface to increase from room temperature to 170° C.

The small-scale disk test method was performed in accordance with the following procedure. First, prior to placing the samples into the furnace frame pockets, the furnace was heated to a temperature of 800 +/−20° C., while the insulating plugs were in place. Once the temperature of the furnace was within the desired temperature range the plugs were removed. Thereafter, the samples to be tested were immediately placed into the frame pockets; and, a timing clock was started. The insulating plugs were then reinserted into the frame pockets such that the temperature monitoring ends of the thermocouples were in direct contact with the samples' upper surface.

The thermocouples recorded the samples' increasing temperature. Once the temperature at the samples' upper surface reached 170° C., the timing clock was stopped. The heat protection time for the individual samples, tested in accordance with the small-scale disk method, are recorded in TABLE IV.

TABLE IV

| Composition | Disk Thickness (mm) | Heat Protection Time (minutes) |
|---|---|---|
| Natural rubber/ aluminum sulfate hydrate | 2 | 9 +/− 1 |
|  | 4 | 20 +/− 1.5 |
|  | 8 | 37 +/− 2 |
| Polyisobutylene/ aluminum sulfate hydrate | 2 | 10 +/− 1 |
|  | 4 | 20 +/− 2.5 |
|  | 8 | 38 +/− 2 |

As can be seen from the data in TABLE IV, the heat protection times of the polyisobutylene/aluminum sulfate hydrate composition are comparable to those of the natural rubber/aluminum sulfate composition.

The specimen samples formed from the first and second mixtures of this example were also subjected to a small-scale flame pipe test. The apparatus employed in performing this test is diagramatically illustrated in FIG. 8.

Figure 8:
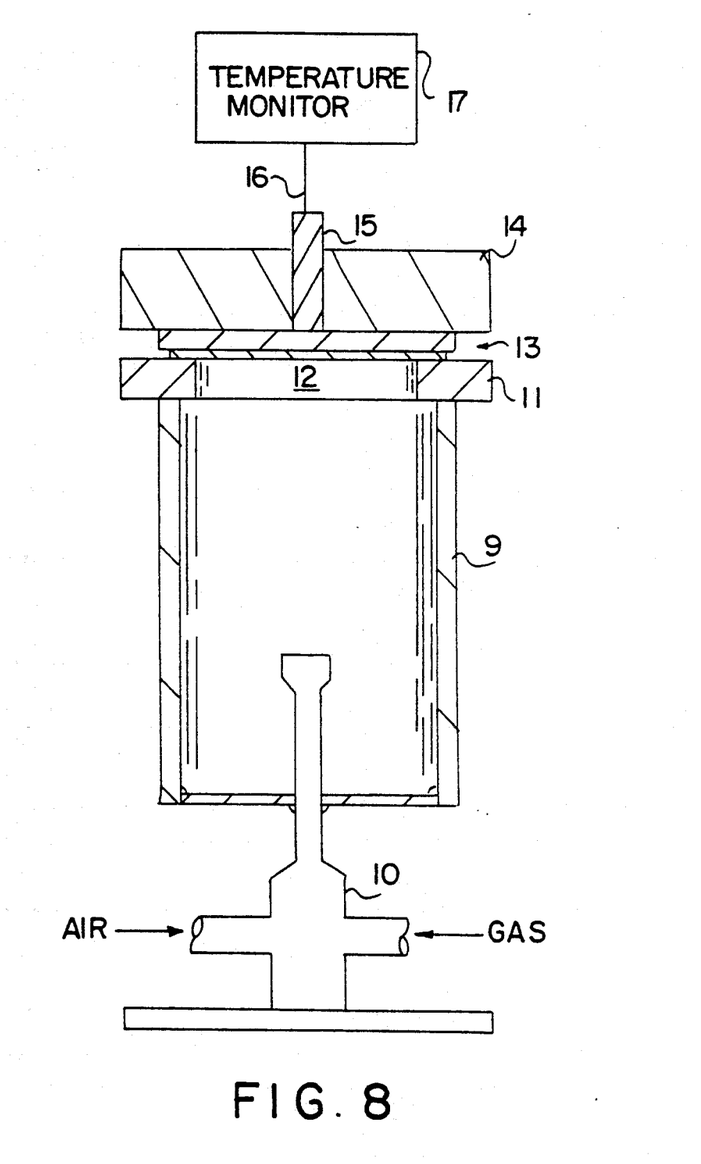
FIG. 8 is a diagrammatic view of a test apparatus for performing a small-scale flame pipe test.

Referring now to FIG. 8, a pipe 8 is attached in a vertical position over the upper end of a burner 9. An insulating frame 10 is placed over the upper opening of pipe 8. Insulating frame 10 has an opening 11 passing therethrough.

A sample, generally identified as 12, was prepared consisting of a sheet of structure wood 13 and a layer of ablative-type test material 14. The test material 14 was glued to the wood sheet 13 by contact-cement. Sample 12 was placed over the opening 11 in insulating frame 10. Sample 12 was dimensioned such that it completely covered opening 11. An insulating plate 15 was placed over sample 12 such that it abutted against the upper surface of wood sheet 13. Insulating plate 15 was dimensioned such that it completely covered the upper surface of wood sheet 13.

Insulating plate 15 had a thermocouple 16 passing therethrough. Thermocouple 16 was positioned such that its temperature monitoring end was in direct contact with the upper surface of wood sheet 13. Thermocouple 16 was operatively connected temperature monitoring device 17.

According to the small-scale flame pipe testing procedure, heat protection time was defined as the time necessary for the surface of the sample, farthest from the flame, to be heated from room temperature to 130° C.

In this example, the temperature sensing end of the thermocouple abutted against the upper surface of wood sheet 13 while the particular ablative-type test material was exposed to the open flame.

The small-scale flame pipe test method was performed by the following procedure. The sample to be tested was placed over an opening in insulating frame such that the heat protection layer would be contacted by the open flame. The insulating plate was placed over the sample such that the thermocouple was in direct contact with the upper surface of the structure layer of the sample.

The burner was ignited; and a timing clock was started. The flame from the burner was adjusted such that it contacted the lower surface of the ablative-type protective layer of the sample. The flame temperature in the immediate vicinity of the sample was approximately 1000±50° C.

The thermocouple began monitoring the increasing temperature of the wood sheet. The test was terminated once the temperature reached 130° C. The heat protection times for the individual samples tested in accordance with this method are recorded in TABLE V.

TABLE V

| Composition | Disk Thickness (mm) | Flame Protection Time (minutes) |
|---|---|---|
| Natural rubber/ aluminum sulfate hydrate | 1.5 2 | 13 +/− 1 14 +/− 1 |
| Polyisobutylene/ aluminum sulfate hydrate | 1.5 2 | 14 +/− 1 16 +/− 1 |

As can be seen from the data in TABLE V, the polyisobutylene/aluminum sulfate hydrate composition has a flame protection time slightly greater than that of the natural rubber/aluminum sulfate hydrate composition.

When comparing this example to Examples II and III it is observed that while the polyisobutylene-containing heat/fire protective material exhibits unexpectedly superior durability characteristics, its flame and heat protection characteristics are at least equal to those exhibited by the natural rubber-containing heat/fire protective material.

EXAMPLE V

This example compares the flame protection times of various heat/fire protective materials.

A first mixture was prepared by roll milling a 10 gram slab of a high-molecular weight polyisobutylene, having an average molecular weight of approximately 800,000 (Vistanex TM MM L-80), a 7 gram slab of a low molecular weight polyisobutylene, having an average molecular weight of approximately 10,000 (Vistanex TM LM-MH), and 83 grams of aluminum sulfate hydrate. A second mixture was prepared by roll milling a 17 gram slab of a polyisobutylene, having an average molecular weight of approximately 400,000 (Rit-Chem TM 4H) and 83 grams of aluminum sulfate hydrate. A third mixture was prepared by roll milling a 17 gram slab of a polyisobutylene, having an average molecular weight of approximately 500,000 (Rit-Chem TM 5H) and 83 grams of aluminum sulfate hydrate. The temperatures during these roll milling processes did not exceed 70° C.

After roll milling, the three mixtures were each compression molded into sheets in accordance with the same procedure set out in Example IV. After the sheets were prepared, each specimen was subjected to an open flame. Visual observations were made.

After being exposed to the open flame for a period of time, the samples prepared from the second and third mixtures began separating into layers, and even began falling down into the flame. On the other hand, when subjected to the same conditions, the sample prepared from the first mixture remained intact, and did not divide into layers.

After testing various ratios of high to low molecular weight polyisobutylene, it was observed that as long as the compositions contained at least 10% by weight of a polyisobutylene having an average molecular weight of at least approximately 800,000, the resulting heat/fire protective compositions remained intact, and did not separate into layers when exposed to an open flame.

EXAMPLE VI

This example demonstrates the versatility of a polyisobutylene/aluminum sulfate hydrate heat/fire protective materials.

In this example, a conduit, having an outside diameter of 1.125 inches, was wrapped in a polyisobutylene/aluminum sulfate hydrate heat/fire protective material. The thickness of the heat/fire protective material was 4.3 +/−0.2 mm. This heat/fire protection material was prepared by roll milling a 20 gram slab of polyisobutylene with 80 grams of aluminum sulfate hydrate. The temperature during the roll milling process did not exceed 70° C.

Figure 9:
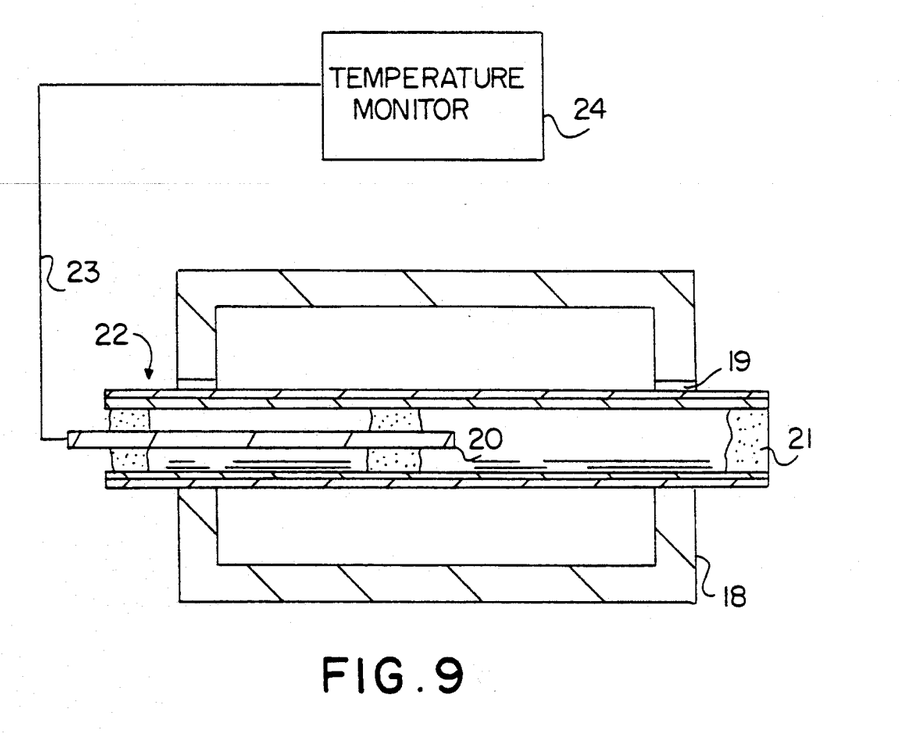
FIG. 9 is a diagrammatic view of a test apparatus for performing tests on conduits wrapped with a heat/fire protective material.

The wrapped conduit was subjected to a testing method using an apparatus similar to that diagramatically illustrated in the FIG. 9. A furnace 18 was employed which had concentric openings 19 and 19' on opposite ends thereof. The wrapped conduit was passed through the openings and rested on the ledges created by the openings. A thermocouple 20 was supported by ceramic wool plugs 21 inside the interior diameter of the conduit 22. The temperature monitoring end of the thermocouple 20 was disposed within the cavity of the conduit. The other end of the thermocouple was operatively attached to temperature monitoring device 24.

In accordance with this testing procedure, the heat/fire protection time was defined as the time necessary for the interior cavity of conduit 22 to be heated from room temperature to 170° C.

The test was performed according to the following procedure. First, prior to placing the wrapped conduit into furnace 18, a plug was placed into each of the concentric openings 19 and 19'. The temperature of the furnace was then raised to 800 +/−25° C. The plugs were then removed. The wrapped conduit was then inserted into the furnace and permitted to rest on the ledges created by openings 19 and 19'. A timing clock was simultaneously started with the introduction of the conduit into the furnace.

The thermocouple began monitoring the temperature within the cavity of the conduit. Once the conduit's internal temperature reached 170° C., the timing clock was stopped. The heat protection time for the 4.3 mm thick polyisobutylene/aluminum sulfate hydrate material was 15±1 minute.

The test was repeated with a 8.6±0.5 mm thick sheet of a similar polyisobutylene/aluminum sulfate hydrate material. The test procedure was the same as that for the 4.3 mm thick sample. The heat protection time for the 8.6 ±0.5 mm thick polyisobutylene/aluminum sulfate hydrate material was 32 +/−2 minutes.

EXAMPLE VII

This example demonstrates the utility of employing a polyisobutylene/aluminum sulfate hydrate material in a sandwich-type application.

A mixture, similar to that prepared from Example V, was taken off a roll mill as a sheet. The sheet was glued either on one layer, or between two layers, of support material. The support material was plywood (6 mm thick), formica (1 mm thick) and/or sheetrock (12.5 mm thick).

This polyisobutylene/aluminum sulfate hydrate sheet was compression molded into plates which were 4 mm (A), 2 mm (B), and 1.2 mm (C) thick. The plate samples were tested according to the small-scale flame pipe test method (See, Example IV).

The temperature monitoring end of the thermocouple was in direct contact with the surface of the sample, farthest from the heating source. The test results are recorded in TABLE VI.

TABLE VI

| Type of Sandwich-Sample | Heat Protection Time (min.) |
| --- | --- |
| 1. Plain sheetrock (12.5 mm thick) | 16 ± 1 |
| 2. Plain plywood (6 mm thick) | 9 ± 1 |
| 3. Plain formica (1.2 mm thick) | 1.5 ± 0.5 |
| 4. Plywood-A | 36 ± 2 |
| 5. Plywood-A-Plywood | 40 ± 2 |
| 6. Plywood-B-Plywood | 20 ± 2 |
| 7. Plywood-C | 15 ± 1 |
| 8. Plywood-A-Formica | 37 ± 2 |
| 9. Formica-A-Formica | 35 ± 2 |
| 10. Sheetrock-A | 58 ± 3 |
| 11. Sheetrock-A-Formica | 52 ± 3 |

*A-Composition prepared by roll milling a 10 gram slab of about 800,000 molecular weight polyisobutylene (Vistanex ™ RM L-80) and a 7 gram slab of about 10,000 average molecular weight polyisobutylene (Vistanex ™ LM-MH), compression molded to a 4 mm thick sample.
B-The same material as A, but 2 mm thick.
C-The same material as A, but 1.2 mm thick.

As can be seen from the data in Table VI, employing the polyisobutylene/aluminum sulfate hydrate heat protective material significantly increased heat protection time.

EXAMPLE VIII

This example further demonstrates the utility of polyisobutylene/aluminum sulfate hydrate heat/fire protective materials in sandwich-type applications.

In this example, sheets of the polyisobutylene/aluminum sulfate hydrate material were prepared from the first mixture in Example V. The material was compression molded into sheets having a thickness of 1.5 +/−0.2 mm.

The heat/fire protective sheets were glued to one or both sides of 2 mm thick stainless steel plates. The heat protection times of these heat/fire protective materials were determined according to a small-scale flame pipe test method (see, Example IV). The flame temperature in the immediate vicinity of the sample was 1050±25° C. In each test the heat/fire protection side was in contact with the flame.

For the samples with the ablative-type protective layer on only one side of the stainless steel sheet, the heat protection time was defined as the time necessary for the surface of the stainless steel, farthest from the flame, to be heated from room temperature to 212° C. On the other hand, for the samples with the ablative-type protective layer on both sides of the stainless steel sheet, a thermocouple was placed between the upper surface of the stainless steel plate and the lower surface of the upper ablative-type protective layer. The flame production times were as follows:

| | |
| --- | --- |
| (a) For sample protected from only one side | 10 ± 1 min. |
| (b) For sample protected from both sides | 13 ± 1 min. |

Further improvement in flame protection time was achieved when the aluminum sulfate hydrate which was employed had a coarse dispersion (i.e., 30–50 mesh). Specifically, the stainless steel plate protected from both sides with the coarser material exhibited a fire protection time of 15±1 min.

EXAMPLE IX

This example demonstrates an attempt to obtain an aluminum sulfate hydrate containing ablative-type material by employing organic binders which must be processed at temperatures above 86.5° C. (see, for example, Table 1 of U.S. Pat. No. 4,462,831).

1. Low density polyethylene (Dow Chemical Co.) was mixed with aluminum sulfate hydrate in a manner similar to that in Example 7 of U.S. Pat. No. 4,462,831, with the exception that the natural rubber was replaced by polyethylene. Mixing was carried out by means of a roll mill maintained at 110°–115° C. (minimum mixing temperature). When the aluminum sulfate hydrate was added to the roll mill, it decomposed. This lead to the release of water. Since the processing temperature of polyethylene is usually much higher than 115° C. in extruders and Banbury mixers, it cannot be used as a binder in combination with aluminum sulfate hydrate.

2. Polypropylene (Amoco Chemical Co.) was mixed with aluminum sulfate hydrate in a manner similar to that in (1) above. The minimum mixing temperature in a roll mill for polypropylene was found to be 150°–165° C. As such, polypropylene cannot be used as a binder in combination with aluminum sulfate hydrate for the same reason as in (1) above.

3. Polystyrene (Amoco Chemical Co.) was mixed with aluminum sulfate hydrate in a manner similar to that in (1) above. The minimum mixing temperature in a roll mill for polystyrene was found to be 105°–110° C. As such, polystyrene cannot be used as a binder in combination with aluminum sulfate hydrate for the same reasons as in (1) above.

4. High styrene rubber (Europrene HS 65 EniChem) was mixed with aluminum sulfate hydrate in a manner similar to that in (1) above. The minimum mixing temperature in a roll mill for this material was found to be 85°–90° C. Although the decomposition of the aluminum sulfate hydrate was observed as being less pronounced than in either (1), (2) or (3) above, the decomposition was still significant.

Only polymers having processing temperatures below the decomposition temperature of aluminum sulfate hydrate can be used as binders in an ablative-type material containing aluminum sulfate hydrate. The majority of plastics (and some rubbers) have processing temperatures far exceeding 100° C. This prevents their effective utilization and combination with aluminum sulfate hydrate.

Besides the organic binders mentioned in Example IX, the following polymers also cannot be utilized in combination with aluminum sulfate hydrate to form an ablative-type material: polycarbonate, nylon, polyethylene terephthalate, polyimides, unplasticized polyvinyl chloride, cellulose and its esters, polyformaldehyde, and the like.

EXAMPLE X

This example demonstrates that not every unsaturated rubber can be used in combination with aluminum sulfate hydrate to form an ablative-type material.

A blend similar to that in Example 7 of U.S. Pat. No. 4,462,831 was prepared, with the exception that natural rubber was replaced by chloroprene rubber—Neoprene WHV (Du Pont). After 3 weeks, at ambient conditions, the resulting material lost its flexibility and broke when an attempt was made to bend the 4 mm thick sheet. On the other hand, a 4 mm thick sheet of plain Neoprene WHV (i.e. without any aluminum sulfate hydrate present) remained flexible after 3 weeks when subjected to the same ambient conditions.

In view of the above, chloroprene rubber (i.e., neoprene), cannot be used as a binder in combination with aluminum sulfate hydrate Neoprene becomes cross linked under to the influence of the sulfate ions.

EXAMPLE XI

This example demonstrates an attempt to obtain an ablative-type protective material with a phenol-formaldehyde resin as the binder material. This phenol-formaldehyde resin hardens at a pH greater than 7.

A blend similar to that in Example 8 of U.S. Pat. No. 4,462,831 was prepared, with the exception that urea-formaldehyde resin was replaced by phenol-formaldehyde resin. The contents of the blends were:

| | |
|---|---|
| Phenol-formaldehyde resin, Mark V (ATS-Products, Inc.) | 20 grams |
| Hardener, Formsel (ATS-Products, Inc.) | 3.3 grams |
| Aluminum sulfate hydrate | 76.7 grams |

The composition would not harden, since the pH of the mixture did not exceed 7.

In view of the above, resins which can only be hardened in a basic medium (pH greater than 7) cannot be used in combination with aluminum sulfate hydrate because the latter imparts acidity to the medium. A majority of phenol-formaldehyde and melania-formaldehyde resins require a basic medium in order to be hardened.

EXAMPLE XII

This example demonstrates an attempt to obtain an ablative-type protective material based on a latex binder which is stable at pH values greater than 7.

A blend was prepared having the following composition:

| | |
|---|---|
| Butadiene-styrene latex, SBR Europrene 2714 (EniChem Inc.) | 40 grams |
| Aluminum sulfate hydrate | 60 grams |

When the aluminum sulfate hydrate was mixed with the butadiene-styrene latex, the mixture immediately coagulated.

In view of the above, latexes, which are stable at pH values greater than 7, cannot be employed in combination with aluminum sulfate hydrate because the latter imparts acidity to the medium. This acidity brings about the coagulation of the latex material. Most rubber latexes are stable at pH values greater than 7 (i.e., pH values in the range from about 10–12). As such, these latexes will coagulate when combined with aluminum sulfate hydrate.

It is evident from the foregoing that various modifications, which are apparent to those skilled in the art, can be made into the embodiments of this invention without departing from the spirit and scope thereof.

That which is claimed is:

1. An ablative protective composition comprising:
   (a) a polymeric binder component, wherein said binder is a polyisobutylene homopolymer or other higher polymer of polyisobutylene, said polyisobutylene homopolymer or other higher polymer of polyisobutylene comprises a plurality of at least a first repeat unit having the form wherein said first repeat unit is present in said polyisobutylene homopolymer or said other higher polymer of polyisobutylene in an amount ranging from about 70 to about 100 mole percent, inclusive, said mole percentages being based on the total moles of repeat units present in said polyisobutylene homopolymer or said other higher polymer of polyisobutylene, and
   (b) an ablative component, wherein said ablative component is an aluminum sulfate hydrate of the general formula wherein n is an integer from 14 through 18, inclusive, and wherein said aluminum sulfate hydrate is present in an amount greater than about 50% by weight of said ablative composition.

2. A composition in accordance with claim 1 wherein said first repeat unit is present in an amount ranging from about 85 to about 100 mole percent, said mole percentages being based on the total moles of repeat units present in said polyisobutylene homopolymer or said other higher polymer of polyisobutylene.

3. A composition in accordance with claim 2 wherein said first repeat unit is present in an amount ranging from about 95 to about 100 mole percent, said mole percentages being based on the total moles of repeat units present in said polyisobutylene homopolymer or said other higher polymer of polyisobutylene.

4. A composition in accordance with claim 1 wherein said binder component is a polyisobutylene homopolymer.

5. A composition in accordance with claim 1 wherein said binder component is a higher polymer of polyisobutylene, and wherein said higher polymer of polyisobutylene further comprises a plurality of a second repeat unit having the form wherein said second repeat unit is present in an amount from about 0 to about 30 mole percent, said mole percentage being based on the total moles of repeat units present in said higher polymer of polyisobutylene.

6. A composition in accordance with claim 5 wherein said binder component is a higher polymer of polyisobutylene, and wherein said higher polymer of polyisobutylene further comprises a plurality of a second repeat unit having the form wherein said second repeat unit is present in an amount from about 0 to about 15 mole percent, said mole percentage being based on the total moles of repeat units present in said higher polymer of polyisobutylene.

7. A composition in accordance with claim 6 wherein said binder component is a higher polymer of polyisobutylene, and wherein said higher polymer of polyisobutylene further comprises a plurality of a second repeat unit having the form wherein said second repeat unit is present in an amount from about 0 to about 5 mole percent, said mole percentage being based on the total moles of repeat units present in said higher polymer of polyisobutylene.

8. A composition in accordance with claim 1 wherein said binder component is present in an amount ranging from about 10 to about 50% by weight of said ablative composition.

9. A composition in accordance with claim 8 wherein said binder component is present in an amount ranging from about 12 to about 40% by weight of said ablative composition.

10. A composition in accordance with claim 9 wherein said binder component is present in an amount ranging from about 15 to about 20% by weight of said ablative composition.

11. A composition in accordance with claim 8 wherein said binder component is a polyisobutylene homopolymer.

12. A composition in accordance with claim 1 wherein said aluminum sulfate hydrate is present in an amount ranging from about 50 to about 90% by weight of said ablative composition.

13. A composition in accordance with claim 12 wherein said aluminum sulfate hydrate is present in an amount ranging from about 60 to about 87% by weight of said ablative composition.

14. A composition in accordance with claim 13 wherein said aluminum sulfate hydrate is present in an amount ranging from about 70 to about 85% by weight of said ablative composition.

15. A composition in accordance with claim 12 wherein said binder component is a polyisobutylene homopolymer.

16. A composition in accordance with claim 1 wherein the weight ratio between said binder component and said aluminum sulfate hydrate ranges from about 1:1 to about 1:10.

17. A composition in accordance with claim 16 wherein the weight ratio between said binder component and said aluminum sulfate hydrate ranges from about 1:2 to about 1:7.

18. A composition in accordance with claim 17 wherein the weight ratio between said binder component and said aluminum sulfate hydrate ranges from about 1:4 to about 1:5.

19. A composition in accordance with claim 16 wherein said binder component is a polyisobutylene homopolymer.

20. A composition in accordance with claim 1 wherein said binder component comprises a blend of a high molecular weight polyisobutylene homopolymer or other higher polymer of polyisobutylene,
  wherein said high molecular weight polymer is present in an amount ranging from about 10 to about 45% by weight, and wherein the average molecular weight of said high molecular weight polymer is at least about 400,000, and
  wherein said low molecular weight polymer is present in an amount ranging from about 40 to about 5% by weight, and wherein the average molecular weight of said low molecular weight polymer is at most about 15,000, said weight percentages being based on the total weight of said ablative composition.

21. A composition in accordance with claim 20 wherein said high molecular weight polymer is present in an amount ranging from about 15 to about 35% by weight and wherein said low molecular weight polymer is present in an amount ranging from about 35 to about 15% by weight, said weight percentages being based on the total weight of said ablative composition.

22. A composition in accordance with claim 21 wherein said high molecular weight polymer is present in an amount ranging from about 20 to about 30% by weight and wherein said low molecular weight polymer is present in an amount ranging from about 30 to about 20% by weight said weight percentages being based on the total weight of said ablative composition.

23. A composition in accordance with claim 20 wherein said high and low molecular weight polymers are polyisobutylene homopolymers.

24. A composition in accordance with claim 20 wherein the average molecular weight of said high molecular weight polymer ranges from about 500,000 to about 3,000,000 and wherein the average molecular weight of said low molecular weight polymer ranges from about 15,000 to about 7,000.

25. A composition in accordance with claim 24 wherein the average molecular weight of said high molecular weight polymer ranges from about 700,000 to about 2,500,000 and wherein the average molecular weight of said low molecular weight polymer ranges from about 15,000 to about 10,000.

26. A composition in accordance with claim 20 wherein the ratio of said high molecular weight polymer to said low molecular weight polymer ranges from about 6:1 to about 1:1.

27. A composition in accordance with claim 26 wherein the ratio of said high molecular weight polymer to said low molecular weight polymer ranges from about 4:1 to about 1:25:1.

28. A composition in accordance with claim 27 wherein the ratio of said high molecular weight polymer to said low molecular weight polymer ranges from about 3:1 to about 1.5:1.

29. A composition in accordance with claim 1 wherein said ablative composition further comprises at least one supplemental component selected from the group consisting of antioxidants, processing agents, and the like.

30. A composition in accordance with claim 1 wherein said ablative composition further comprises at least one reinforcement material selected from the group consisting of cloth, fiberglass, metal wire, and the like.

31. A composition in accordance with claim 1 wherein said aluminum sulfate hydrate is present in a form of a liquid solution.

32. A composition in accordance with claim 1 wherein said aluminum sulfate hydrate is present in a form of a suspension in a liquid medium.

33. A composition in accordance with claim 1 wherein said aluminum sulfate hydrate is present in a form of a powder.

34. A composition in accordance with claim 1 wherein said ablative composition is employed in the manufacturing of sheets, rolls, pastes, coatings, and the like.

35. A composite construction comprising a support layer and an ablative composition layer, wherein said ablative composition layer comprises:

(a) a polymeric binder, component wherein said binder is a polyisobutylene homopolymer or other higher polymer of polyisobutylene, said polyisobutylene homopolymer or other higher polymer of polyisobutylene comprises a plurality of at least a first repeat unit having the form wherein said first repeat unit is present in said polyisobutylene homopolymer or said other higher polymer of polyisobutylene in an amount ranging from about 70 to about 100 mole percent, inclusive, said mole percentages being based on the total moles of repeat units present in said polyisobutylene homopolymer or said other higher polymer of polyisobutylene, and (b) an ablative component, wherein said ablative component is an aluminum sulfate hydrate of the general formula $$Al_2(SO_4)_3 \cdot nH_2O$$

wherein n is an integer from 14 through 18, inclusive, and wherein said aluminum sulfate hydrate is present in an amount greater than about 50% by weight of said ablative composition layer.

36. A composite construction in accordance with claim 35 wherein said ablative composition layer is sandwiched between two layers of a support base material.

37. An ablative composition comprising:
(a) a polyisobutylene homopolymer binder component having an average molecular weight ranging from about 500,000 to about 3,000,000, and
(b) an aluminum sulfate hydrate ablative component of the general formula
$$Al_2(SO_4)_3 \cdot nH_2O$$

wherein n is an integer from 14 through 18, inclusive,
said polyisobutylene homopolymer binder component is present in an amount ranging from about 12 to about 40% by weight and said aluminum sulfate hydrate ablative component is present in an amount ranging from about 60 to about 87% by weight, said weight percentages being based on the total weight of said ablative composition, and wherein the ratio of said polyisobutylene homopolymer binder component to said aluminum sulfate hydrate ablative component ranges from about 1:2 to about 1:7.

* * * * *